(12) United States Patent
Song et al.

(10) Patent No.: US 12,424,951 B2
(45) Date of Patent: Sep. 23, 2025

(54) NON-POLAR SUPPLY CIRCUIT FOR BRUSHLESS DC MOTOR AND CONTROL METHODS THEREOF

(71) Applicant: GUANGDE JIURUI MOTOR CO., LTD., Anhui (CN)

(72) Inventors: Chao Song, Xuancheng (CN); Fei Chen, Xuancheng (CN); Dongqiang Xu, Xuancheng (CN)

(73) Assignee: GUANGDE JIURUI MOTOR CO., LTD., Xuancheng (CN)

( * ) Notice: Subject to any disclaimer, the term of this patent is extended or adjusted under 35 U.S.C. 154(b) by 166 days.

(21) Appl. No.: 18/399,639

(22) Filed: Dec. 28, 2023

(65) Prior Publication Data

US 2024/0128900 A1     Apr. 18, 2024

Related U.S. Application Data

(63) Continuation of application No. PCT/CN2023/098508, filed on Jun. 6, 2023.

(30) Foreign Application Priority Data

Apr. 6, 2022  (CN) .......................... 202210355349.1

(51) Int. Cl.
  *H02P 6/08*     (2016.01)
  *H02P 6/30*     (2016.01)
(52) U.S. Cl.
  CPC . *H02P 6/08* (2013.01); *H02P 6/30* (2016.02)
(58) Field of Classification Search
  CPC .. H02P 6/08; H02P 6/30; H02H 7/085; H02H 7/09
  See application file for complete search history.

(56) References Cited

U.S. PATENT DOCUMENTS

| 7,005,813 | B2 | 2/2006 | Xi | |
| 2007/0029958 | A1* | 2/2007 | Clermonts | ................ H02P 6/06 |
| | | | | 318/432 |
| 2020/0346766 | A1* | 11/2020 | Lohman | ................ B64D 33/02 |

FOREIGN PATENT DOCUMENTS

| CN | 107086827 A | 8/2017 |
| CN | 110932617 A | 3/2020 |

(Continued)

OTHER PUBLICATIONS

International Search Report in PCT/CN2023/098508 mailed on Sep. 15, 2023, 6 pages.

(Continued)

*Primary Examiner* — Muhammad S Islam
(74) *Attorney, Agent, or Firm* — PORUS IP LLC (57) ABSTRACT

The present disclosure relates to an non-polar supply circuit for brushless DC motor and control method thereof, relating to the field of motor technology, including a microcontroller chip, a polarity judgment circuit, a pre-drive and power switching circuit, a voltage sampling circuit, and a current sampling circuit; The microcontroller chip includes a plurality of pins, the circuits mentioned above is connected to different pins, and the brushless DC motor is connected to the pre-drive and power switching circuit. The brushless DC motor can replace the traditional brush motor by utilizing the non-polar supply circuit, has the advantages of high efficiency and low noise, and compared with the traditional brush DC motor, the brushless DC motor of the present disclosure does not increase the wiring complexity, can directly replace the traditional brush motor. The design scheme is simple and easy to implement.

6 Claims, 10 Drawing Sheets

(56) References Cited

FOREIGN PATENT DOCUMENTS

| | | |
|---|---|---|
| CN | 211352092 U | 8/2020 |
| CN | 114744927 A | 7/2022 |

OTHER PUBLICATIONS

Written Opinion in PCT/CN2023/098508 mailed on Sep. 15, 2023, 6 pages.

\* cited by examiner

Bus voltage sampling

NON-POLAR SUPPLY CIRCUIT FOR BRUSHLESS DC MOTOR AND CONTROL METHODS THEREOF

CROSS-REFERENCE TO RELATED APPLICATIONS

This application is a continuation of International Application No. PCT/CN2023/098508, filed on Jun. 6, 2023, which claims the priority of Chinese application No. 202210355349.1, filed on Apr. 6, 2022, the entire contents of each of which are incorporated herein by reference.

TECHNICAL FIELD

The present invention relates to the field of motor technology, and in particular, to a non-polar power supply circuit for brushless DC motor and control methods thereof.

BACKGROUND

A DC brush motor is a traditional DC motor with brushes installed on a stator and commutators installed on a rotor. The electric energy passes through the brushes and commutators to generate an armature current, which drives the DC brush motor to rotate and work. A structure of the DC brush motor provided with the brushes and commutators is complex. The DC brush motor also has the problems of low efficiency, high noise, poor reliability, large interference to the power supply from the current pulsation, large electromagnetic interference, short life, high starting current, etc.

The brushless DC motor eliminates the disadvantages of the complex structure of the DC brush motor. There are no brushes and commutators in the brushless DC motor. A brushless DC motor module is composed of a brushless motor and a control circuit that matches the brushless motor. The polarity of a power input of the control circuit is fixed, and the power supply cannot be connected reversely. If the power supply is connected reversely, the brushless motor does not work in minor cases, and in serious cases, irreversible damage to the control circuit may be caused. The DC brushless motor needs additional circuits to switch a rotation direction and additional external control signals to switch between a forward rotation and a reverse rotation, so the circuit wiring of the DC brushless motor is very complex.

For the DC brush motor, the rotation direction may be switched by simply exchanging the wiring positions of two power lines. However, the polarity of the power input of the DC brushless motor is fixed, and the power supply can not be connected reversely. Once the power supply is connected reversely, the DC brushless motor will be damaged. To control the forward rotation and reverse rotation of the DC brushless motor, a chip may be used to read a key switching signal or the line sequence of the DC brushless motor may be adjusted, that is, additional signals are needed to switch the rotation direction. Therefore, in actual products, the DC brushless motor often cannot directly replace the DC brush motor. To solve this problem, in the prior art, a full-bridge rectifier circuit composed of diodes is generally used to realize a polarity conversion of the power supply. In the full-bridge rectifier circuit, the input current needs to pass through two diodes, which causes a problem of voltage reduction, and the power loss may increase as the current increases, wherein the power loss is the product of the current and a sum of the voltage drops of the two diodes. In such cases, the working efficiency of the entire circuit will be greatly reduced. Therefore, it is desirable to provide a new scheme to solve the problem of complex wiring and low working efficiency.

SUMMARY

An aspect of the present disclosure provides a non-polar supply circuit for a brushless DC motor and control methods thereof to solve the technical problems mentioned in the background.

To achieve the above purpose, the present disclosure discloses a non-polar supply circuit for a brushless DC motor, comprising,
   a pre-drive and power switching circuit connected to the brushless DC motor;
   a polarity judgment circuit;
   a voltage sampling circuit;
   a current sampling circuit; and
   a microcontroller chip with at least 15 pins, including a GPIO1 pin, a GPIO2 pin, a VDD pin, a VSS pin, an ADC_IN1 pin, an ADC_IN2 pin, an ADC_IN3 pin, an ADC_IN4 pin, an ADC_IN5 pin, a PWM1P pin, a PWM1N pin, a PWM2P pin, a PWM2N pin, a PWM3P pin, and a PWM3N pin; wherein the GPIO1 pin and the GPIO2 pin are connected to the polarity judgment circuit, the VDD pin is a power input, the VSS pin is a ground pin, the ADC_IN4 pin is connected to the voltage sampling circuit, the ADC_IN5 pin is connected to the current sampling circuit; the ADC_IN1, the ADC_IN2 pin, the ADC_IN3 pin, the PWM1P pin, the PWM1N pin, the PWM2P pin, the PWM2N pin, the PWM3P pin, and the PWM3N pin are connected to the pre-drive and power switching circuit, respectively.

Further, the non-polar supply circuit for the brushless DC motor also comprises a rectifier circuit, the rectifier circuit is connected to the polarity judgment circuit and the pre-drive and power switching circuit, respectively.

Furthermore, the non-polar supply circuit for the brushless DC motor also comprises a voltage regulator circuit, the voltage regulator circuit is connected to the rectifier circuit, the pre-drive and power switching circuit, and the microcontroller chip, respectively.

Furthermore, the voltage regulator circuit comprises a supply voltage regulator circuit for the pre-drive and power switching circuit and a supply voltage regulator circuit for the microcontroller chip; the supply voltage regulator circuit for the pre-drive and power switching circuit is connected to the pre-drive and power switching circuit to provide supply voltage to the pre-drive and power switching circuit; and the supply voltage regulator circuit for the microcontroller chip is connected to the VDD pin of the microcontroller chip to provide supply voltage to the microcontroller chip.

Further, the polarity judgment circuit comprises a first level detection circuit and a second level detection circuit, the first level detection circuit outputs an incoming power level 1, the second level detection circuit outputs an incoming power level 2, the GPIO1 pin is connected to the incoming power level 1, and the GPIO2 pin is connected to the incoming power level 2.

The present disclosure also provides a control method for the non-polar supply circuit for a brushless DC motor described above, and the control method includes the following steps:
   (1) reading an incoming power level using the polarity judgment circuit, if the incoming power level is high, controlling, by the microcontroller chip, the brushless DC motor to rotate forward, and if the incoming power level is low, controlling, by the microcontroller chip, the brushless DC motor to reverse;

(2) sampling and calculating a current by the current sampling circuit, sampling and calculating a voltage by the voltage sampling circuit, and if there is an undervoltage or an overvoltage, controlling the brushless DC motor to stop; determining whether a locked-rotor occurs through an algorithm calculation based on the current and voltage, and in response to determining that the locked-rotor occurs, controlling the brushless DC motor to stop;

(3) reading the incoming power level by the polarity judgment circuit, determining whether a rotation direction of the brushless DC motor needs to be changed, and in response to determining that the rotation direction of the brushless DC motor needs to be changed, controlling the brushless DC motor to stop after decelerating and change the rotation direction, or in response to determining that the rotation direction of the brushless DC motor does not need to be changed, controlling the brushless DC motor to operate normally, then determining whether the brushless DC motor is operating normally through an algorithm calculation based on the current and the voltage, and in response to determining that the brushless DC motor is operating normally, continuing to sample and calculate the voltage, or in response to determining that the brushless DC motor is not operating normally, repeating step (2).

The non-polar supply circuit for brushless DC motor and control methods thereof of the present disclosure have the following advantages compared with the prior art:

(1) The brushless DC motor may replace the traditional brushless motor and has the advantages of high efficiency, low noise, long life, etc. of the brushless motor.
(2) Compared with the traditional DC brush motor, the non-polar supply circuit for the brushless DC motor of the present disclosure does not increase the wiring complexity and has only two wires, which can directly replace the DC brush motor. The design scheme is simple and easy to implement.
(3) The rotation direction of the brushless DC motor changes as the polarity of the power supply voltage changes, which can adapt to PWM speed regulation.

The reference signs are described as follows: 1. rectifier circuit; 2. microcontroller chip; 3. voltage regulator circuit; 4. polarity judgment circuit; 5. pre-drive and power switching circuit; 6. voltage sampling circuit; 7. current sampling circuit; 8. first level detection circuit; 9. second level detection circuit; 10. first linear voltage regulator circuit; 11. second linear voltage regulator circuit; 12. third linear voltage regulator circuit; 13. fourth linear voltage regulator circuit; 14. brushless DC motor; 15. supply voltage regulator circuit for the pre-drive and power switching circuit; 16. supply voltage regulator circuit for the microcontroller chip.

DETAILED DESCRIPTION

The following is a detailed description of the technical solution of the present disclosure through specific embodiments. Obviously, the described embodiments are part of the embodiments of the present disclosure, but not all of them. Based on the embodiments of the present disclosure, all other embodiments obtained by those skilled in the art without exerting creative effort fall within the scope of protection of the present disclosure.

Referring to FIG. 1 to FIG. 13, the non-polar supply circuit for a brushless DC motor in this embodiment includes a rectifier circuit 1, a microcontroller chip 2, a voltage regulator circuit 3, a polarity judgment circuit 4, a pre-drive and power switching circuit 5, a voltage sampling circuit 6, and a current sampling circuit 7; wherein the pre-drive and power switching circuit 5 is connected to the brushless DC motor 14.

Figure 1:
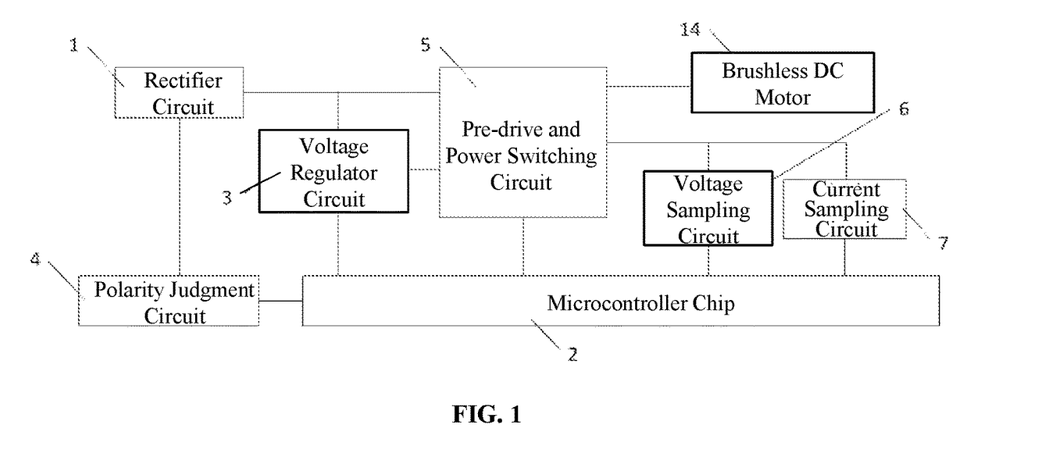
FIG. 1 is a schematic diagram illustrating hardware of a non-polar supply circuit for a brushless DC motor according to some embodiments of the present disclosure.
Figure 3:
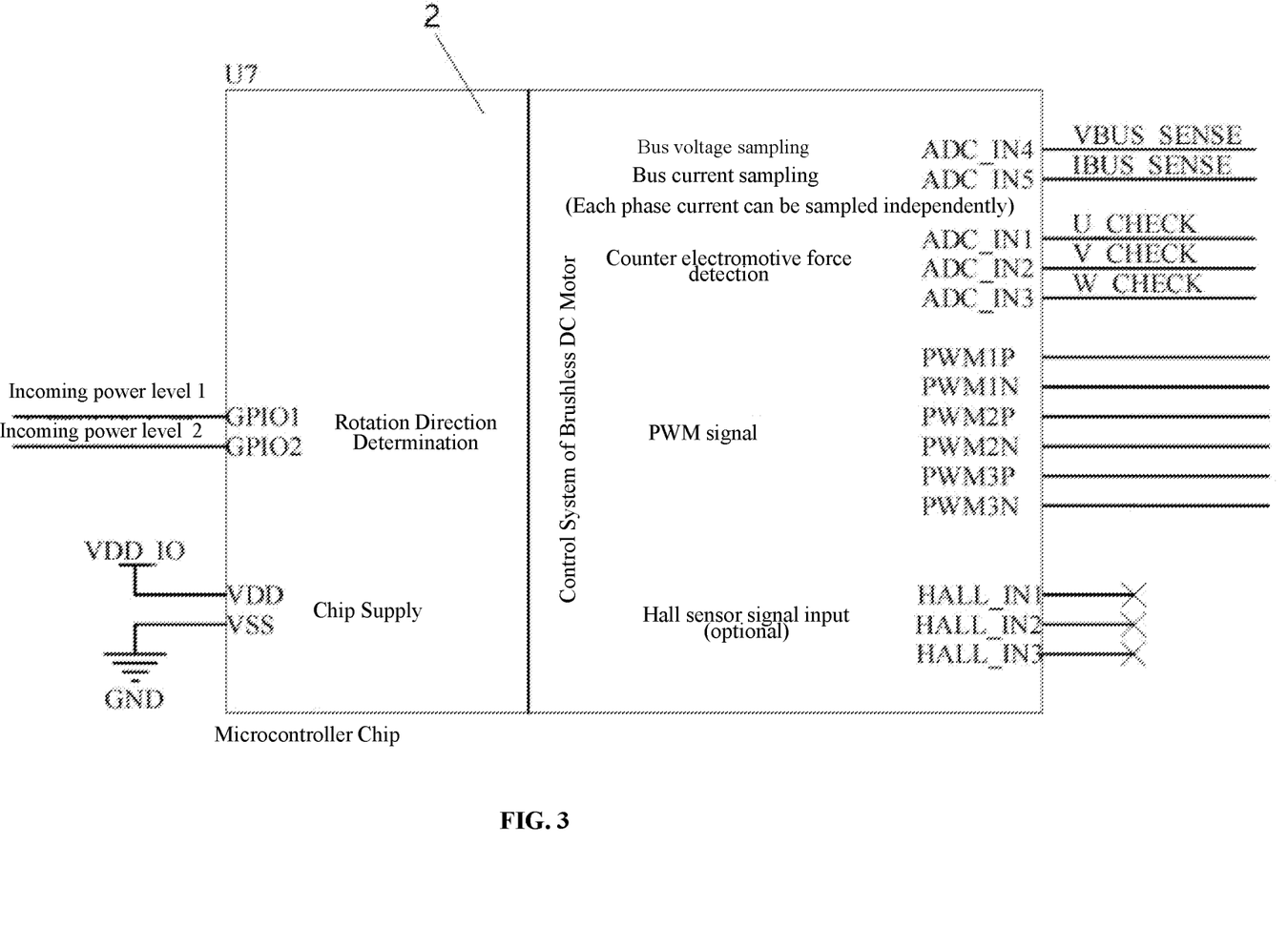
FIG. 3 is a schematic diagram illustrating a circuit of a microcontroller chip illustrated in FIG. 2.

The microcontroller chip 2 has at least 15 pins, including a GPIO1 pin, a GPIO2 pin, a VDD pin, a VSS pin, an ADC_IN1 pin, an ADC_IN2 pin, an ADC_IN3 pin, an ADC_IN4 pin, an ADC_IN5 pin, a PWM1P pin, a PWM1N pin, a PWM2P pin, a PWM2N pin, a PWM3P pin, and a PWM3N pin; wherein the GPIO1 pin and the GPIO2 pin are connected to the polarity judgment circuit 4, the polarity judgment circuit 4 includes a first level detection circuit 8 and a second level detection circuit 9, the first level detection circuit 8 outputs an incoming power level 1, the second level detection circuit 9 outputs an incoming power level 2. Specifically, the GPIO1 pin is connected to the incoming power level 1, the GPIO2 pin is connected to the incoming power level 2, the VDD pin is the power input connected to VDD_IO, the VSS pin is a ground pin connected to GND, the ADC_IN1 pin, the ADC_IN2 pin, the ADC_IN3 pin, the PWM1P pin, the PWM1N pin, the PWM2P pin, the PWM2N pin, the PWM3P pin, and the PWM3N pin are connected to the pre-drive and power switching circuit 5, respectively, the ADC_IN4 pin is connected to the voltage sampling circuit 6, and the ADC_IN5 pin is connected to the current sampling circuit 7.

Figure 6:
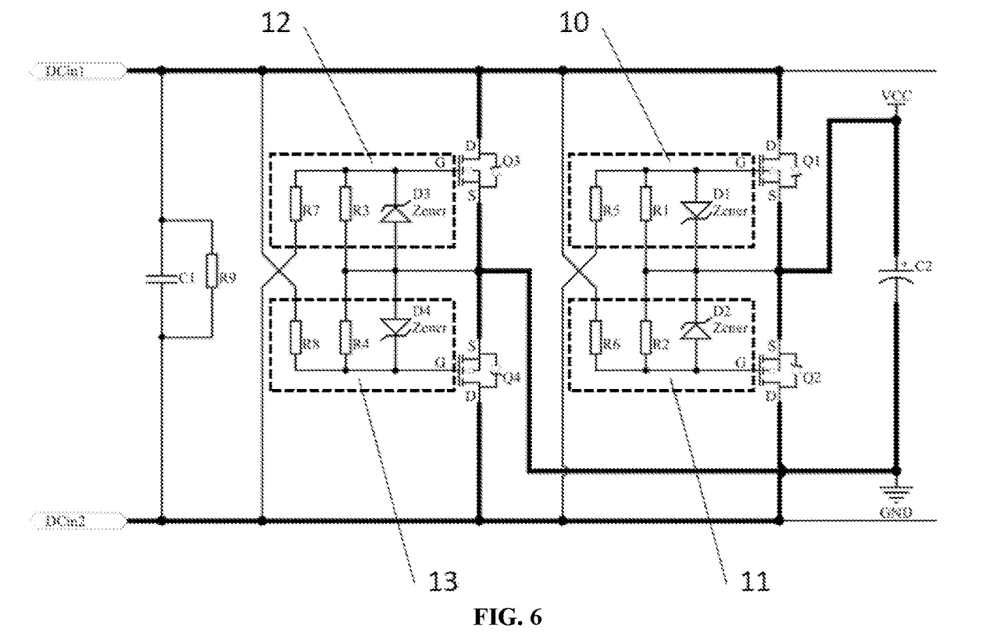
FIG. 6 is a schematic diagram of the rectifier circuit illustrated in FIG. 5.

The rectifier circuit 1 includes resistors R1-R8, voltage regulator diodes D1-D4, P-channel power MOSFETs Q1 and Q2, N-channel power MOSFETs Q3 and Q4, and an energy storage capacitor C2.

The two ends of the rectifier circuit 1 are connected to a power input signal DCin1 and a power input signal DCin2, respectively, a capacitor C1 is connected between DCin1 and DCin2, the two ends of the capacitor C1 are connected in parallel with a resistor R9, and C1 and R9 may suppress the common mode interference of the power supply.

Q1, Q2, Q3, and Q4 are connected between DCin1 and DCin2, wherein the S electrode of Q1 is connected to the S electrode of Q2, the D electrode of Q1 is connected to DCin1, and the D electrode of Q2 is connected to DCin2; the S electrode of Q3 is connected to the S electrode of Q4, the D electrode of Q3 is connected to DCin1, and the D electrode of Q4 is connected to DCin2.

The rectifier circuit 1 comprises four linear voltage regulator circuits, which are the first linear voltage regulator circuit 10, the second linear voltage regulator circuit 11, the third linear voltage regulator circuit 12, and the fourth linear voltage regulator circuit 13, wherein the first linear voltage regulator circuit 10 comprises D1, R1, and R5, one end of D1, one end of R1, and one end of R5 are all connected to the G electrode of Q1, the other end of D1 and the other end of R1 are both connected to the S electrode of Q1, and the other end of R5 is connected to DCin2; the second linear voltage regulator circuit 11 comprises D2, R2, and R6, one end of D2, one end of R2, and one end of R6 are all connected to the G electrode of Q2, the other end of D2 and the other end of R2 are both connected to the S electrode of Q2, and the other end of R6 is connected to DCin1; the third linear voltage regulator circuit 12 comprises D3, R3, and R7, one end of D3, one end of R3, and one end of R7 are all connected to the G electrode of Q3, the other end of D3 and the other end of R3 are both connected to the S electrode of Q3, and the other end of R7 is connected to DCin2; the four linear voltage regulator circuit 13 comprises D4, R4, and R8, one end of D4, one end of R4, and one end of R8 are all connected to the G electrode of Q4, the other end of D4 and the other end of R4 are both connected to the S electrode of Q4, and the other end of R8 is connected to DCin1. The first linear voltage regulator circuit 10, the second linear voltage regulator circuit 11, the third linear voltage regulator circuit 12, and the fourth linear voltage regulator circuit 13 provide driving signals for Q1, Q2, Q3, Q4, respectively, and the driving signals do not exceed the upper limit of the driving voltage of the MOSFETs to prevent the MOSFETs from being damaged.

Working principle: When the DC power supply is connected to DCin1 and DCin2, there are two cases:

In the first case, DCin1 is V+, DCin2 is V−, V+ charges C2 through a body diode of the MOSFET Q1, and flows from the body diode of Q4 to V−, forming a loop.

At the same time, the G electrode of Q1 is reduced from R5 to V−, in such a case, the S electrode of Q1 is close to V+, the VGS of Q1 is a negative voltage, and Q1 is on;
the G electrode of Q2 is raised from R6 to V+, in such a case, the S electrode of Q2 is close to V+, the VGS of Q2 is low level, and Q2 is off; the G electrode of Q3 is reduced from R7 to V−, in such a cases, the S electrode of Q3 is close to V−, the VGS of Q3 is low level, and Q3 is off;
the G electrode of Q4 is raised from R8 to V+, in such a case, the S electrode of Q4 is close to V−, the VGS of Q4 is high level, and Q4 is on.

Then V+ is connected to the positive electrode of C2 through Q1, and V− is connected to the negative electrode of C2 through Q4.

In the second case, DCin1 is V−, DCin2 is V+, V+ charges C2 through the body diode of Q2, and flows from the body diode of Q3 to V−, forming a loop.

At the same time, the G electrode of Q1 is raised from R5 to V+, in such a case, the S electrode of Q1 is close to V+, the VGS of Q1 is low level, and Q1 is off;
the G electrode of Q2 is reduced from R6 to V−, in such a case, the S electrode of Q2 is close to V+, the VGS of Q2 is negative voltage, and Q2 is on;
the G electrode of Q3 is raised from R7 to V+, in such a case, the S electrode of Q3 is close to V−, the VGS of Q3 is high level, and Q3 is on;
the G electrode of Q4 is reduced from R8 to V−, in such a case, the S electrode of Q4 is close to V−, the VGS of Q4 is low level, and Q4 is off.

Then V+ is connected to the positive electrode of C2 through Q2, and V− is connected to the negative electrode of C2 through Q3.

Figure 5:
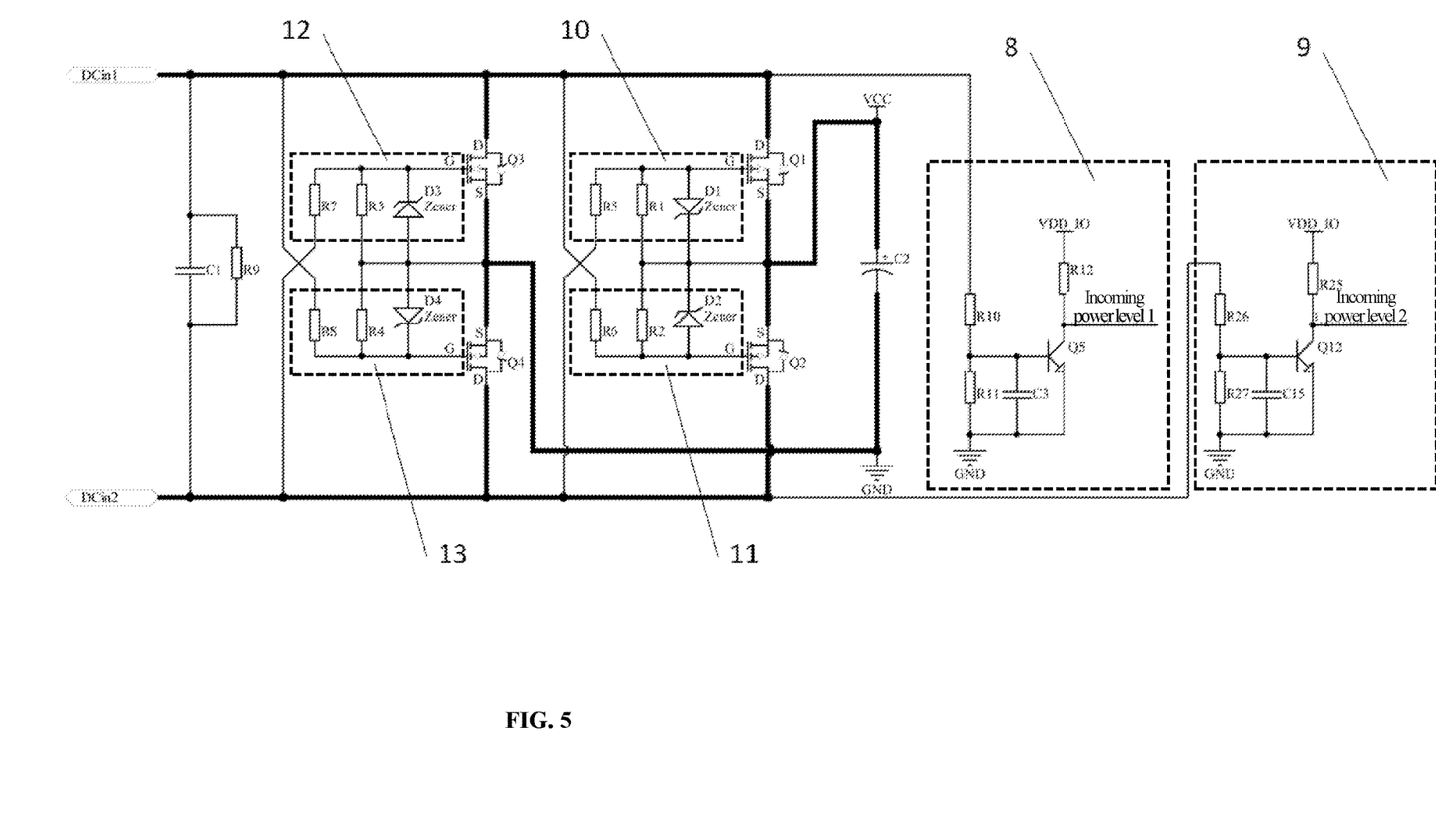
FIG. 5 is a schematic diagram illustrating a connection circuit of a rectifier circuit and a polarity judgment circuit according to the embodiment illustrated in FIG. 1.
Figure 7:
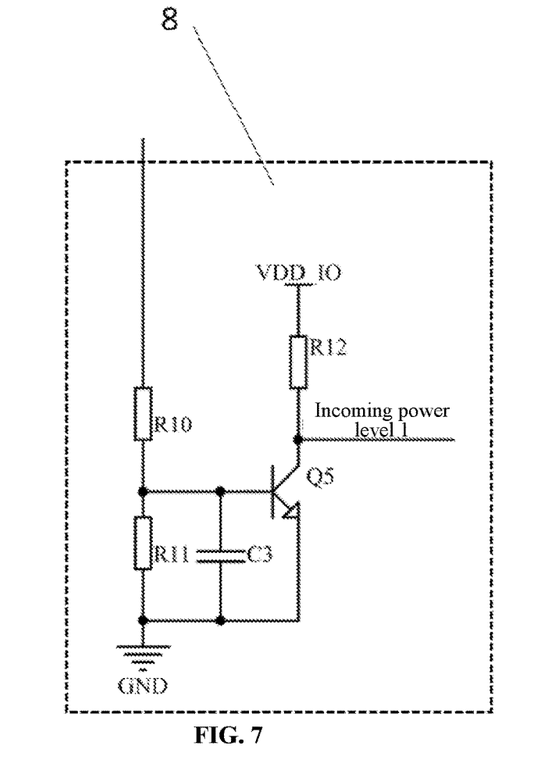
FIG. 7 is a schematic diagram illustrating a circuit of a first level detection circuit of the polarity judgment circuit illustrated in FIG. 5.

In the polarity judgment circuit 4, the first level detection circuit 8 includes resistors R10, R11, and R12, a capacitor C3, and a transistor Q5, where R10 and R11 are connected in series, C3 is connected to both ends of R11 in parallel, one end of C3 is connected to the base B of the transistor Q5, and the other end of C3 is connected to the emitter E of the transistor Q5. A collector C of the transistor Q5 is connected to one end of the resistor R12, the other end of R12 is connected to the power supply VDD_IO, and the incoming power level 1 is output between R12 and the collector C of the transistor Q5.

When DCin1 is connected to V−, R10 is connected to a low level, the current of a base of Q5 is 0, Q5 is cut off, the collector of Q5 is raised to VDD_IO by R12, and the microcontroller chip detects a high level. When DCin1 is connected to V+, R10 is connected to the high level, the current flows through the base of Q5, Q5 reaches a saturation state, the voltage of the collector of Q5 is reduced to GND, and the microcontroller chip detects a low level. C3 is an optional signal filter capacitor used to filter out fluctuating signals when the power supply is just connected but not reliably connected.

Figure 8:
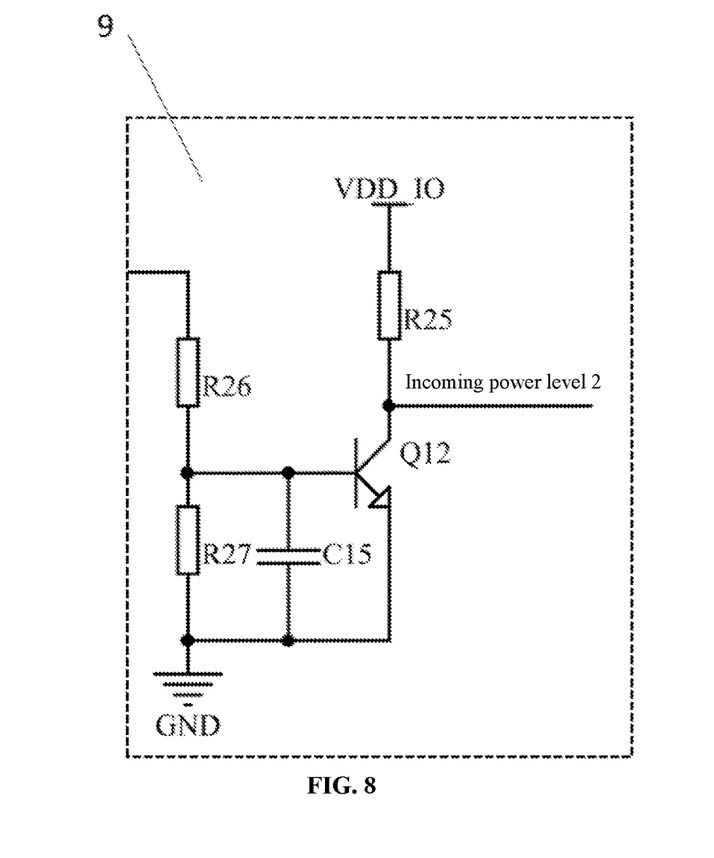
FIG. 8 is a schematic diagram illustrating a circuit of a second level detection circuit of the polarity judgment circuit illustrated in FIG. 5.

The second level detection circuit 9 includes resistors R25, R26, and R27, a capacitor C15, and a transistor Q12, where R26 and R27 are connected in series, C15 is connected to both ends of R27 in parallel, one end of C15 is connected to the base B of the transistor Q12, and the other end of C15 is connected to the emitter E of the transistor Q12. The collector C of the transistor Q12 is connected to the one end of the resistor R25, the other end of R25 is connected to the power supply VDD_IO, the incoming power level 2 is output between R25 and the collector C of the transistor Q12. The principle of the second level detection circuit 9 is the same as that of the first level detection circuit 8.

If a constant voltage source is input to the power line, the microcontroller chip 2 may determine whether the motor is rotating forward or reverse by a state of one level only.

If a power signal in PWM form is input to the power line, the microcontroller chip 2 may determine the rotation direction of the motor based on a relationship between the states of the two levels and determine a corresponding speed and other setting values according to a pulse width duty ratio.

Figure 4:
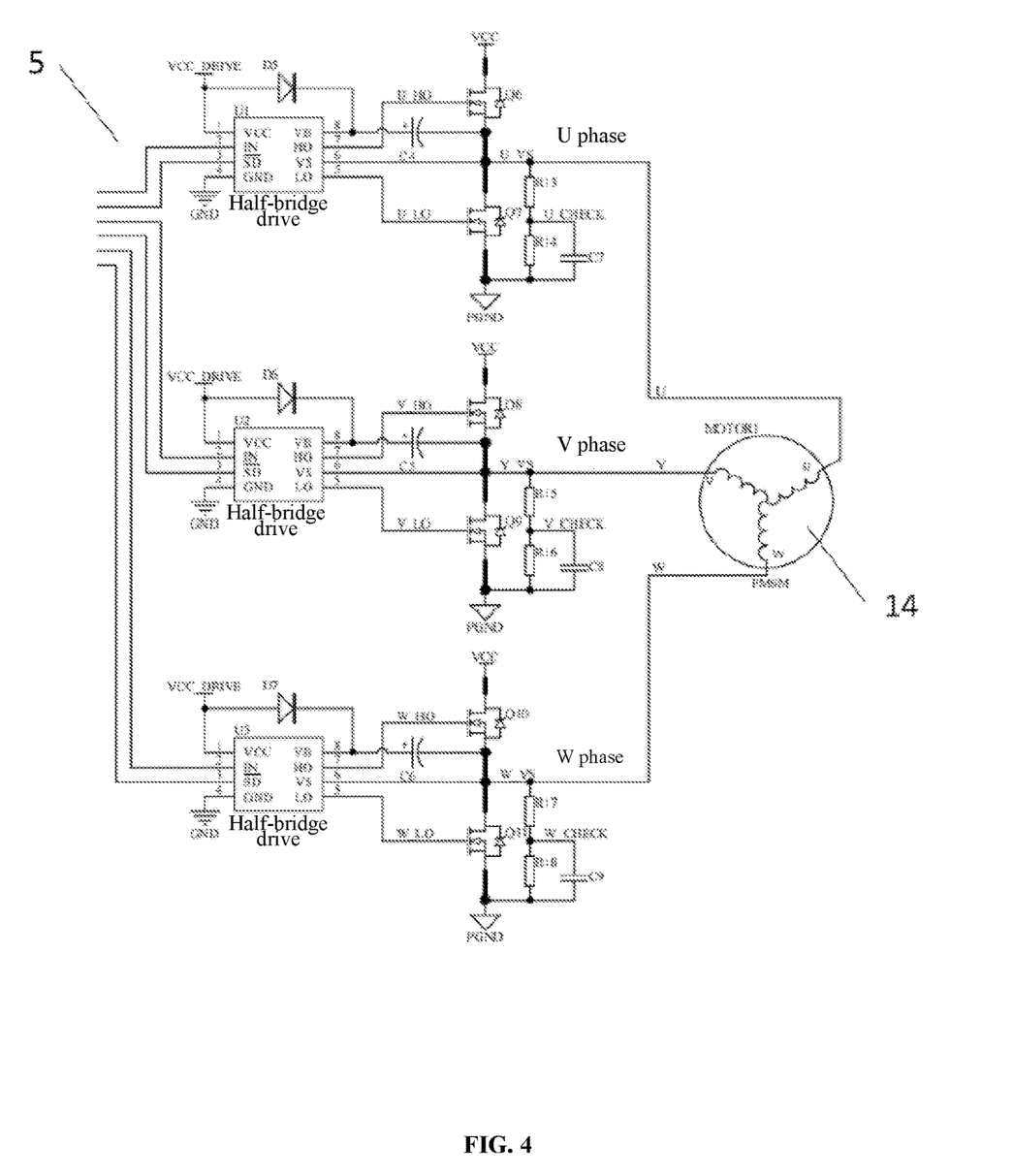
FIG. 4 is a schematic diagram illustrating a circuit of the pre-drive and power switching circuit illustrated in FIG. 2.

The pre-drive and power switching circuit 5 is connected to the brushless DC motor 14, and a three-phase motor drive circuit includes a U phase, a V phase, and a W phase, wherein the U phase is taken as an analysis object, and the principles of V phase and W phase are the same as U phase.

In the U phase, MOSFETs Q6 and Q7 which are not on simultaneously form a power switching circuit (half-bridge).

R13, R14, and C7 form the counter electromotive force detection circuit of the U phase of the motor, which divides the voltage of the counter electromotive force and reduces the voltage to an input voltage range of a microcontroller voltage acquisition ADC circuit.

U1, D5, and C4 form an MOSFET pre-drive circuit, an input signal of U1 is from two PWM signals of the microcontroller, and a level of each of the two PWM signals is between 1.8-5.5V usually. U1 converts the input signal into a more powerful driving signal and outputs the driving signal to LO and HO to drive Q6 and Q7. A built-in logic of U1 ensures that Q6 and Q7 are not on simultaneously.

The drive signal of Q7 on a low side is LO, the low level is 0V, and the high level is VCC_DRIVE;

the drive signal of Q6 on a high side is HO, this channel is a suspension drive, when Q7 on the low side is on, VCC_DRIVE charges C4 through D5, and the voltage at both ends of C4 is close to VCC_DRIVE. When Q7 on the low side is off and Q6 on the high side needs to be switched on, an internal circuit of U1 may disconnect VS and HO, and connect VB and HO, the G electrode of Q6 may obtain a driving voltage from C4, and Q6 may switch on. When Q6 needs to be turned off, U1 may disconnect VB and HO, and connect VS and HO, that is, the G electrode and the S electrode of Q6 may be short-circuited, and Q6 may be turned off.

Figure 2:
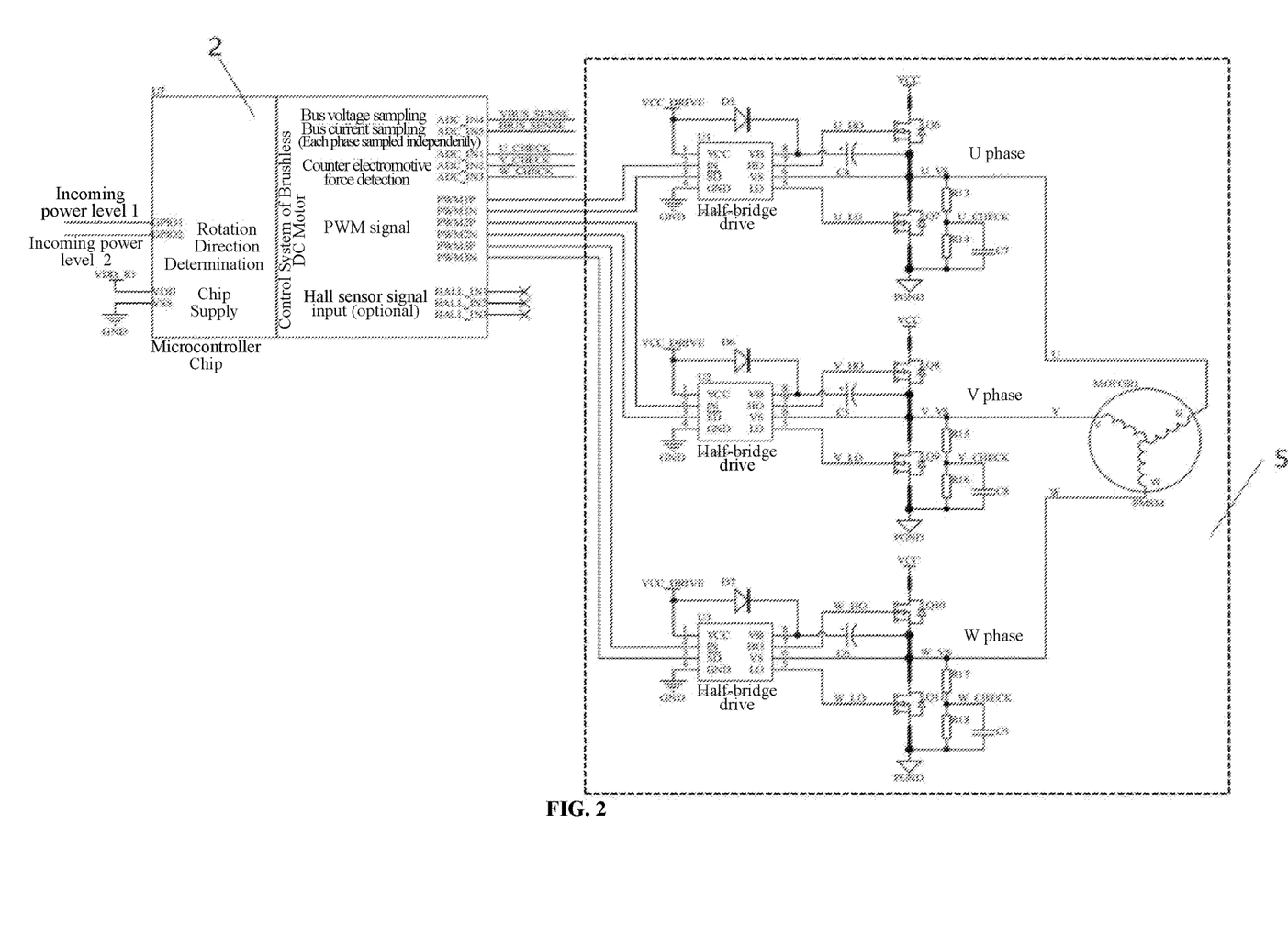
FIG. 2 is a schematic diagram illustrating a connection circuit of a microcontroller chip and a pre-drive and power switching circuit according to the embodiment illustrated in FIG. 1.

In the pre-drive and power switching circuit 5, the output signal U_CECK of the U phase is connected to the ADC_IN1 pin, the output signal V_CHECK of the V phase is connected to the ADC_IN2 pin, and the output signal W_CHECK of the W phase is connected to the ADC_IN3 pin.

Figure 9:
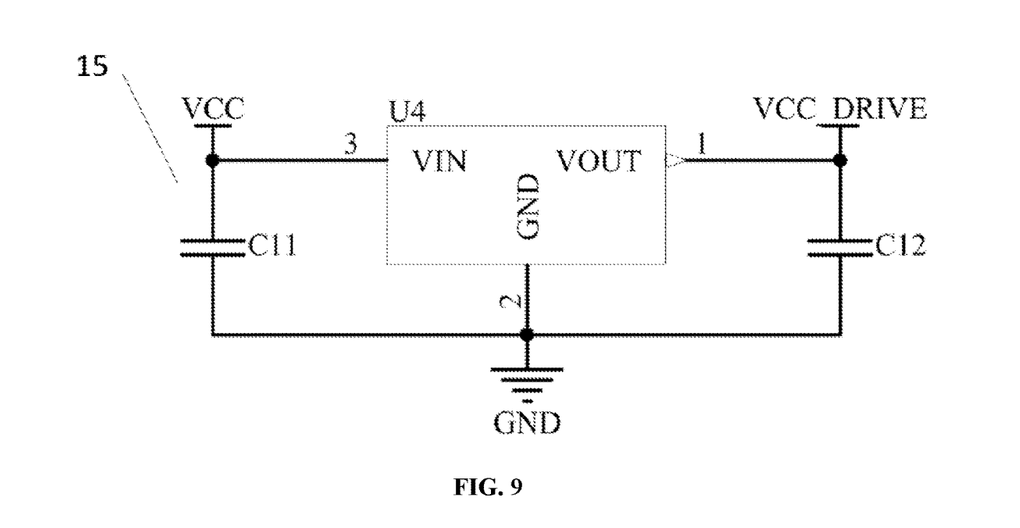
FIG. 9 is a schematic diagram illustrating a circuit of a supply voltage regulator circuit for the pre-drive and power switching circuit according to the embodiment illustrated in FIG. 1.
Figure 10:
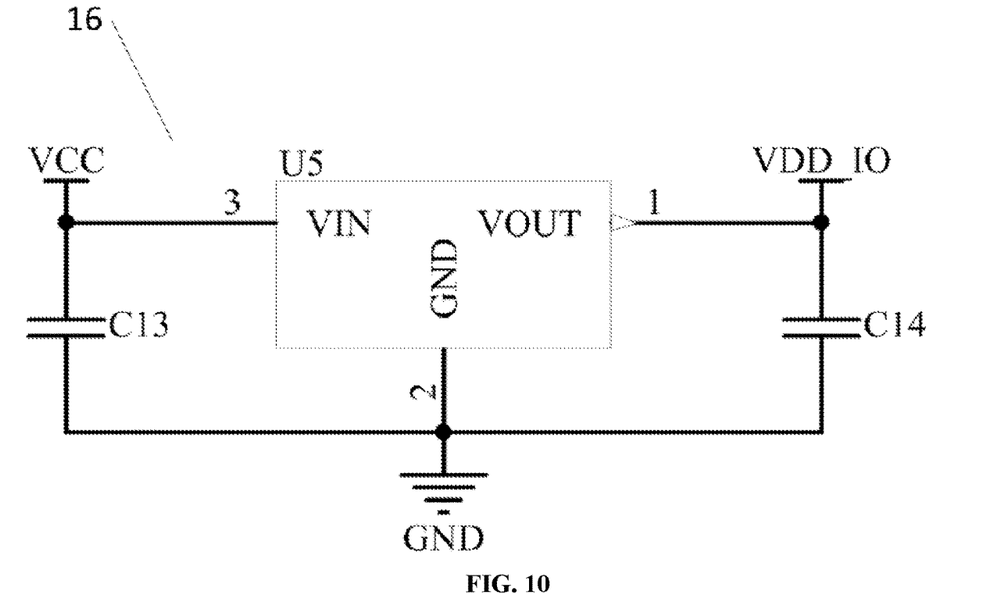
FIG. 10 is a schematic diagram illustrating a circuit of a supply voltage regulator circuit for a microcontroller chip according to the embodiment illustrated in FIG. 1.

The voltage regulator circuit 3 comprises two parts, one is a supply voltage regulator circuit 15 for the pre-drive and power switching circuit and the other is a supply voltage regulator circuit 16 for the microcontroller chip, providing power to the pre-drive and power switching circuit 5 and the microcontroller chip 2, respectively.

The supply voltage regulator circuit 15 for the pre-drive and power switching circuit comprises a voltage regulator chip U4, and the voltage regulator chip U4 is provided with three pins including a VIN pin, a VOUT pin, and a GND pin. A capacitor C11 is connected between the VIN pin and the GND pin, a capacitor C12 is connected between the VOUT pin and the GND pin, the GND pin is grounded, the VIN pin is connected to VCC, the VOUT pin outputs a VCC_DRIVE signal, and the VCC_DRIVE is connected to the pre-drive and power switching circuit.

Generally, when a MOSFET drive voltage is between 10-15V, the MOSFET has the smallest on-resistance, small loss, and optimal performance. The filter capacitors C11, C12, and the voltage regulator chip U4 form a linear step-down voltage regulator circuit, which stabilizes an input voltage between 10-15V. If the VCC voltage is low, the voltage regulator circuit may be changed to a booster circuit or a boost-buck circuit, which may be adjusted according to the actual power supply conditions.

The supply voltage regulator circuit 16 for the microcontroller chip comprises a voltage regulator chip U5, the voltage regulator chip U5 is provided with three pins including a VIN pin, a VOUT pin, and a GND pin, a capacitor C13 is connected between the VIN pin and the GND pin, a capacitor C14 is connected between the VOUT pin and the GND pin, the GND pin is grounded, the VIN pin is connected to VCC, the VOUT pin outputs VCC_IO signal, and the VCC_IO is connected to the VDD pin of the microcontroller chip.

The power supply voltage of the microcontroller chip 2 is usually between 1.8V-5.5V, the filter capacitors C13, and C14, and the voltage regulator chip U5 form a linear step-down voltage regulator circuit, which stabilizes the input voltage between 1.8V-5.5V, and it is not limited to adjust the voltage regulator circuit to a booster circuit, a buck circuit, or a boost-buck circuit according to the actual power supply conditions.

Figure 11:
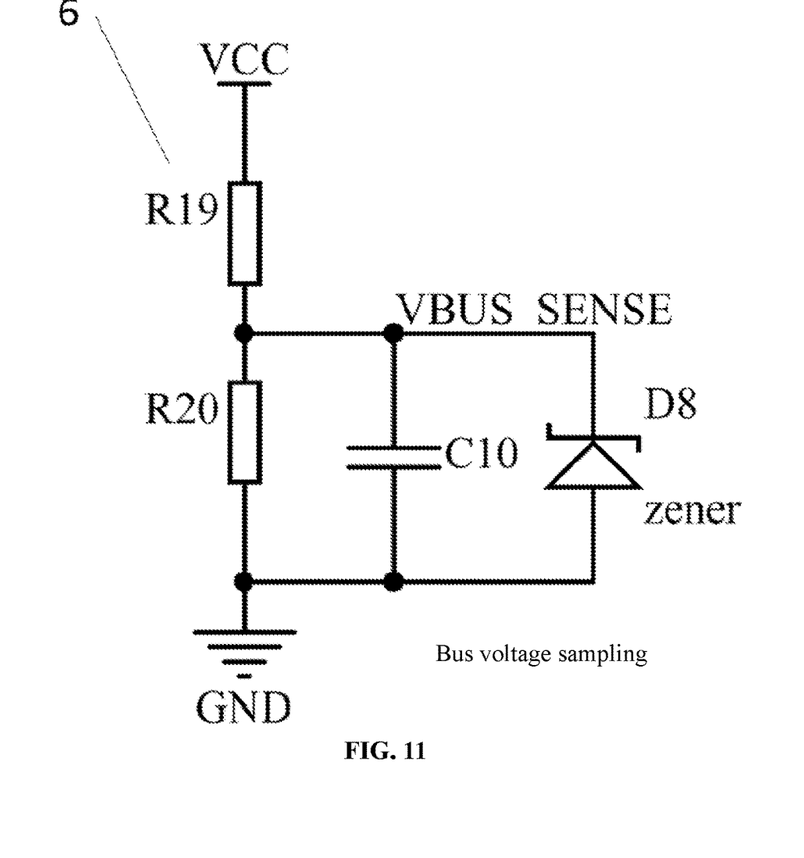
FIG. 11 is a schematic diagram illustrating a circuit of a voltage sampling circuit according to the embodiment illustrated in FIG. 1.

The voltage sampling circuit 6 includes a resistor R19, a resistor R20, a capacitor C10, and a diode D8. R19 and R20 are connected in series, the capacitor 10 and the diode D8 are connected in parallel at both ends of R20, an end of R19 away from R20 is connected to VCC, an end of R20 away from R19 is connected to GND, a VBUS SENSE signal is output at the position where R20 and R19 are connected, and the position where R20 and R19 are connected is further connected to the ADC_IN4 pin of the microcontroller chip;

R19 and R20 for voltage division divide VCC into the input voltage range of the microcontroller voltage acquisition ADC circuit. A VCC voltage may be converted proportionally by program, C10 is a signal filtering capacitor, D8 is a voltage regulator diode or a TVS diode, thereby clamping the VBUS_SENSE signal, absorbing an abnormal peak voltage, and preventing damage to the microcontroller chip.

Figure 12:
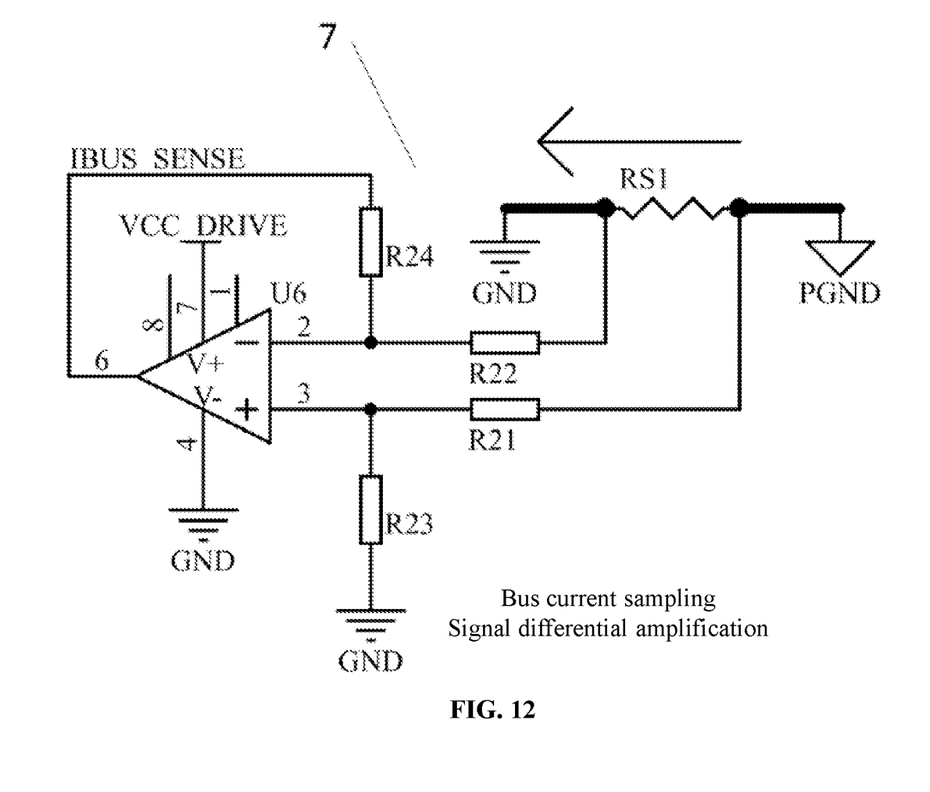
FIG. 12 is a schematic diagram illustrating a circuit of a current sampling circuit according to the embodiment illustrated in FIG. 1.

The current sampling circuit 7 includes resistors R21, R22, R23, and R24 and an amplifier U6, which constitute a differential amplifier circuit, the amplifier U6 is provided with seven pins, which are pins 1-4 and pins 6-8. The pin 7 outputs the VCC_DRIVE signal, the pin 4 is connected to GND, the pin 6 outputs an IBUS_SENSE signal, which is connected to the ADC_IN5 pin on the microcontroller chip. One end of the resistor R24 is connected to the pin 6, and the other end of the resistor R24 is connected to the pin 2. One end of the resistor R23 is connected to GND, and the other end of the resistor R23 is connected to the pin 3. The other end of resistor R24 is connected to one end of the resistor R22, the other end of resistor R23 is connected to one end of the resistor R21, the other end of the resistor R22 and the other end of the resistor R21 are connected to a current sampling resistor RS1, one end of RS1 is connected to GND, and the other end of RS1 is connected to PGND.

RS1 is the current sampling resistor, R21, R22, R23, R24, and U6 form the differential amplification circuit. When the motor is driven, the current flows from VCC through the power switching circuit to the motor, then through PGND, and then through RS1 to GND. When the current flows through RS1, a voltage drop is generated at both ends of RS1, the differential amplification circuit amplifies the signal to the input voltage range of the microcontroller voltage acquisition ADC circuit, and then an instantaneous current of the circuit may be obtained.

Figure 13:
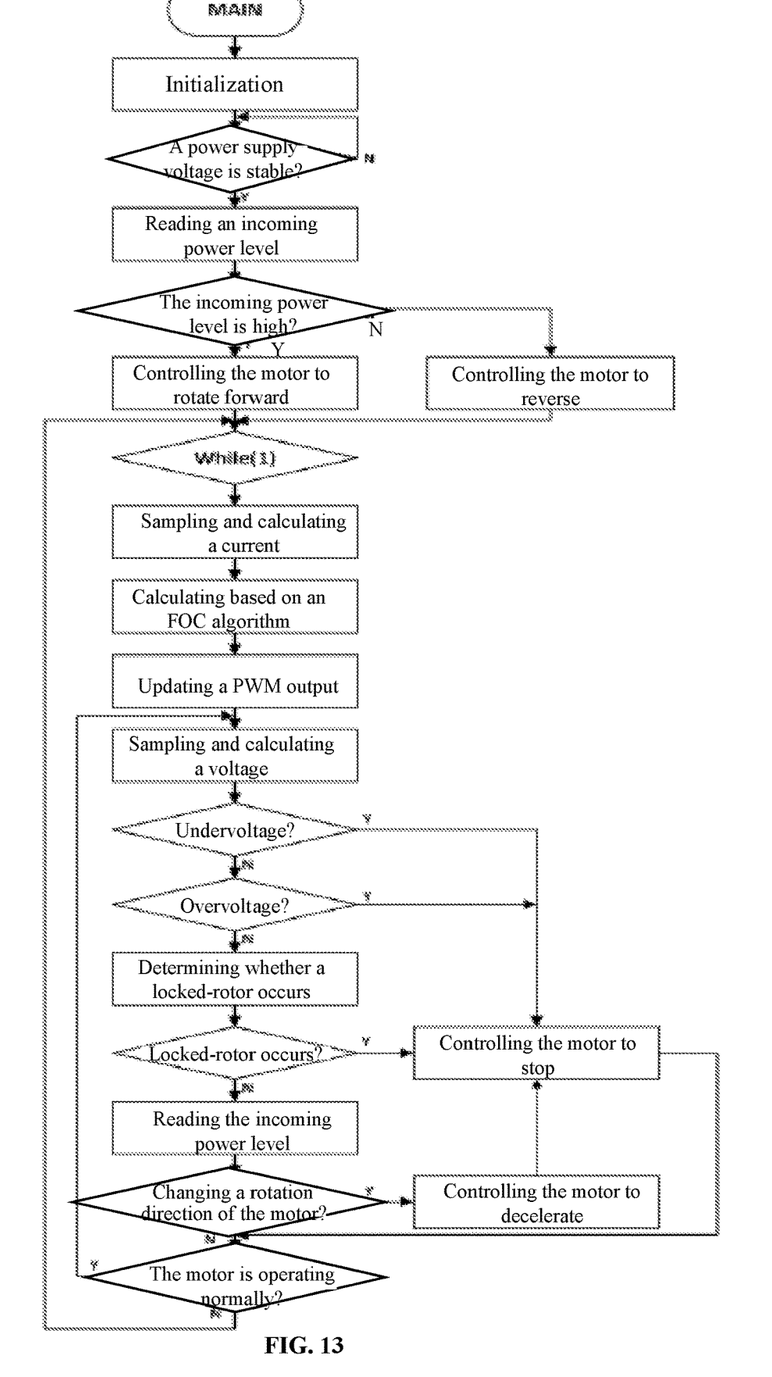
FIG. 13 is a flowchart illustrating a control method for the non-polar supply circuit for the brushless DC motor according to the embodiment illustrated in FIG. 1.

The control method for the non-polar supply circuit for the brushless DC motor in this embodiment includes:
the voltage regulator circuit 3 determining whether the power supply voltage is stable, if the power supply voltage is stable, the polarity judgment circuit 4 reading an incoming power level, if the incoming power level is high, the microcontroller chip controlling the motor (i.e., the brushless DC motor) to rotate forward, if the incoming power level is low, the microcontroller chip controlling the motor to reverse;

the current sampling circuit 7 sampling and calculating the current, calculating based on an FOC algorithm, updating a PWM output, then the voltage sampling circuit 6 sampling and calculating the voltage; if there is an undervoltage or an overvoltage, controlling the motor to stop; determining whether a locked-rotor occurs through algorithm calculation based on the current and the voltage, in response to determining that the locked-rotor occurs, controlling the motor to stop;

the polarity judgment circuit 4 reading the incoming power level, determining whether a rotation direction of the motor needs to be changed, and in response to determining that the rotation direction of the motor needs to be changed, controlling the motor to stop after decelerating and change the rotation direction, or in response to determining that the rotation direction of the motor does not need to be changed, controlling the motor to operate normally, then determining whether the motor is operating normally through algorithm calculation based on the current and the voltage, and in response to determining that the motor is operating normally, continuing to sample and calculate the voltage, or in response to determining that the motor is not operating normally, repeating step (2), that is, continuing to sample and calculate the current, and repeating the aforementioned workflow.

In the present invention, no matter which of the two power lines is positive or negative, "formatted" is realized through the rectifier circuit, the circuit may work by fixing the positive or negative electrode, and it only needs to identify how one power line is connected, if the power line is connected to the positive electrode, the motor is controlled to rotate forward, if the power line is connected to the negative electrode, the motor is controlled to reverse. The circuit design is simple, and the control process is easy to realize.

The description above is only a better embodiment of the present invention and is not used to limit the scope of protection of the present invention, and any modification, equivalent replacement, improvement, etc. made within the design concept of the present invention should be covered within the scope of protection of the present invention.

What is claimed is:

1. A non-polar supply circuit for a brushless DC motor, comprising,
    a pre-drive and power switching circuit connected to the brushless DC motor;
    a polarity judgment circuit;
    a voltage sampling circuit;
    a current sampling circuit; and
    a microcontroller chip with at least 15 pins, comprising a GPIO1 pin, a GPIO2 pin, a VDD pin, a VSS pin, an ADC_IN1 pin, an ADC_IN2 pin, an ADC_IN3 pin, an ADC_IN4 pin, an ADC_IN5 pin, a PWM1P pin, a PWM1N pin, a PWM2P pin, a PWM2N pin, a PWM3P pin, and a PWM3N pin;
    wherein the GPIO1 pin and the GPIO2 pin are connected to the polarity judgment circuit, the VDD pin is a power input, the VSS pin is a ground pin, the ADC_IN4 pin is connected to the voltage sampling circuit, the ADC_IN5 pin is connected to the current sampling circuit, the ADC_IN1, the ADC_IN2 pin, the ADC_IN3 pin, the PWM1P pin, the PWM1N pin, the PWM2P pin, the PWM2N pin, the PWM3P pin, and the PWM3N pin are connected to the pre-drive and power switching circuit, respectively.

2. The non-polar supply circuit for a brushless DC motor according to claim 1, further comprising a rectifier circuit, the rectifier circuit being connected to the polarity judgment circuit and the pre-drive and power switching circuit, respectively.

3. The non-polar supply circuit for a brushless DC motor according to claim 2, further comprising a voltage regulator circuit, the voltage regulator circuit being connected to the rectifier circuit, the pre-drive and power switching circuit, and the microcontroller chip, respectively.

4. The non-polar supply circuit for a brushless DC motor according to claim 3, wherein
    the voltage regulator circuit comprises a supply voltage regulator circuit for the pre-drive and power switching circuit and a supply voltage regulator circuit for the microcontroller chip; the supply voltage regulator circuit for the pre-drive and power switching circuit is connected to the pre-drive and power switching circuit to provide a supply voltage to the pre-drive and power switching circuit; and the supply voltage regulator circuit for the microcontroller chip is connected to the VDD pin of the microcontroller chip to provide a supply voltage to the microcontroller chip.

5. The non-polar supply circuit for a brushless DC motor according to claim 1, wherein the polarity judgment circuit comprises a first level detection circuit that outputs an incoming power level 1 connected to the GPIO1 pin and a second level detection circuit that outputs an incoming power level 2 connected to the GPIO2 pin.

6. A control method for the supply circuit for a brushless DC motor according to claim 1, comprising:
    (1) reading an incoming power level by the polarity judgment circuit, if the incoming power level is high, controlling, by the microcontroller chip, the brushless DC motor to rotate forward, and if the incoming power level is low, controlling, by the microcontroller chip, the brushless DC motor to reverse;
    (2) sampling and calculating a current by the current sampling circuit, sampling and calculating a voltage by the voltage sampling circuit, and if there is an undervoltage or an overvoltage, controlling the brushless DC motor to stop; determining whether a locked-rotor occurs through algorithm calculation based on the current and the voltage, and in response to determining that the locked-rotor occurs, controlling the brushless DC motor to stop;
    (3) reading an incoming power level by the polarity judgment circuit, determining whether a rotation direction of the brushless DC brushless DC motor needs to be changed, and in response to determining that the rotation direction of the brushless DC motor needs to be changed, controlling the brushless DC motor to stop after decelerating and change the rotation direction, or in response to determining that the rotation direction of the brushless DC motor does not need to be changed, controlling the brushless DC motor to operate normally, then determining whether the brushless DC motor is operating normally through algorithm calculation based on the current and the voltage, and in response to determining that the brushless DC motor is operating normally, continuing to sample and calculate the voltage, or in response to determining that the brushless DC motor is not operating normally, repeating step (2).

* * * * *